US012254550B2

(12) United States Patent
Bocquelet et al.

(10) Patent No.: US 12,254,550 B2
(45) Date of Patent: *Mar. 18, 2025

(54) SYSTEM AND METHOD FOR GENERATING CHARACTER POSES USING DEEP LEARNING

(71) Applicant: Unity IPR ApS, Copenhagen (DK)

(72) Inventors: Florent Benjamin Bocquelet, La Motte-Servolex (FR); Dominic Laflamme, Hudson (CA); Boris Oreshkin, Mont-Royal (CA)

(73) Assignee: Unity IPR ApS, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,041

(22) Filed: May 23, 2023

(65) Prior Publication Data

US 2024/0062446 A1    Feb. 22, 2024

Related U.S. Application Data

(63) Continuation of application No. 17/326,211, filed on May 20, 2021, now Pat. No. 11,694,382.

(Continued)

(51) Int. Cl.
*G06T 13/40*    (2011.01)
*G06N 20/00*    (2019.01)
*G06T 7/70*    (2017.01)

(52) U.S. Cl.
CPC ............ *G06T 13/40* (2013.01); *G06N 20/00* (2019.01); *G06T 7/70* (2017.01); *G06T 2200/04* (2013.01);

(Continued)

(58) Field of Classification Search
CPC . G06T 13/40; G06T 7/70; G06T 2207/20044; G06T 2207/20084; G06T 2200/04; G06T 2207/20081; G06T 13/20; G06T 2207/30196; G06T 13/00; G06N 20/00; G06N 3/0454; G06N 3/08;
(Continued)

(56) References Cited

U.S. PATENT DOCUMENTS

| 2019/0295305 A1* | 9/2019 | Yang ..................... G06N 3/044 |
| 2021/0097266 A1* | 4/2021 | Mangalam ............. G06N 3/045 |

(Continued)

OTHER PUBLICATIONS

U.S. Appl. No. 17/326,211, Corrected Notice of Allowability mailed Feb. 28, 2023, 6 pgs.

(Continued)

*Primary Examiner* — Xilin Guo
(74) *Attorney, Agent, or Firm* — Schwegman Lundberg & Woessner, P.A.

(57) ABSTRACT

A method of generating or modifying poses in an animation of a character are disclosed. Variable numbers and types of supplied inputs are combined into a single input. The variable numbers and types of supplied inputs correspond to one or more effector constraints for one or more joints of the character. The single input is transformed into a pose embedding. The pose embedding includes a machine-learned representation of the single input. The pose embedding is expanded into a pose representation output. The pose representation output includes local rotation data and global position data for the one or more joints of the character.

20 Claims, 5 Drawing Sheets

Related U.S. Application Data

(60) Provisional application No. 62/706,729, filed on Sep. 4, 2020.

(52) U.S. Cl.
CPC ............... *G06T 2207/20044* (2013.01); *G06T 2207/20081* (2013.01); *G06T 2207/20084* (2013.01)

(58) Field of Classification Search
CPC ...... G06N 3/044; G06V 40/103; G06V 40/23; G06V 10/82; G06F 3/011; G06F 3/017
See application file for complete search history.

(56) References Cited

U.S. PATENT DOCUMENTS

| | | | |
|---|---|---|---|
| 2021/0308580 A1* | 10/2021 | Akhoundi | ............. A63F 13/655 |
| 2022/0076472 A1 | 3/2022 | Bocquelet et al. | |

OTHER PUBLICATIONS

U.S. Appl. No. 17/326,211, Non Final Office Action mailed Sep. 19, 2022, 22 pgs.
U.S. Appl. No. 17/326,211, Notice of Allowance mailed Feb. 22, 2023, 10 pgs.
U.S. Appl. No. 17/326,211, Response filed Jan. 19, 2023 to Non Final Office Action mailed Sep. 19, 2022, 9 pgs.
"Advanced Character Animation Systems for Unity", Root Motion, [Online], Retrieved from the Internet: <URL: http://root-motion.com>, (Accessed Feb. 2, 2023), 5 pgs.
"How to Use Deep Learning in Character Posing", Cascadeur, [Online]. Retrieved from the Internet: <URL: https://cascadeur.com/ru/blog/general/how-to-use-deep-learning-in-character-posing>, (Accessed May 14, 2021), 5 pgs.
"How to Use Deep Learning in Character Posing", ACM SIGGRAPH Blog, [Online]. Retrieved from the Internet: <URL: https://blog.siggraph.org/2019/11/how-to-use-deep-learning-in-character-posing.html>, (Nov. 26, 2019), 11 pgs.
"Inside Facebook Reality Labs: Research updates and the future of social connection", Tech@Facebook, [Online]. Retrieved from the Internet: <URL: https://tech.fb.com/inside-facebook-reality-labs-research-updates-and-the-future-of-social-connection/>, (Sep. 25, 2019), 24 pgs.
"Using AI to make NBS players dance", Xpire Medium, [Online]. Retrieved from the Internet: <URL: https://medium.com/@getxpire/how-we-used-ai-to-make-nba-players-dance-2fdbe6c63a97>, (Mar. 13, 2019), 7 pgs.
Aristidou, Andreas, et al., "FABRIK: A fast, iterative solver for the Inverse Kinematics problem", Graphical Models 73, (2011), 18 pgs.
Buttner, Michael, et al., "[Nucl.ai 2015] Motion Matching—The Road to Next Gen Animation—YouTube", YouTube, [Online]. Retrieved from the Internet: <URL: https://www.youtube.com/watch?v=z_wpgHFSWss&t=658s>, (Accessed May 14, 2021), 2 pogs.
Cai, Yujun, et al., "Exploiting Spatial-temporal Relationships for 3D Pose Estimation via Graph Convolutional Networks", ICCV paper provided by Computer Vision Foundation, (2019), 10 pgs.
Capece, Nicola, et al., "A Low-Cost Full Body Tracking System in Virtual Reality Based on Microsoft Kinect", 5th International Conference, AVR 2018, Otranto, Italy, Jun. 24-27, 2018, Proceedings, Part II, (2018), 623-635.
Casillas-Perez, David, "Full Body Gesture Recognition for Human-Machine Interaction in Intelligent Spaces", Bioinformatics and Biomedical Engineering, 4th International Conference, IWBBIO 2016 Granada, Spain, Apr. 20-22, 2016 Proceedings, (2016), 664-676.
Chai, Jinxiang, et al., "Performance Animation from Low-dimensional Control Signals", ACM SIGGRAPH 2005 Papers, [Online] Retrieved from the Internet: <URL: http://graphics.cs.cmu.edu/projects/performance-animation/jchai_pa.pdf>, (2005), 11 pgs.

Chaudhry, Rizwan, et al., "Bio-inspired Dynamic 3D Discriminative Skeletal Features for Human Action Recognition", Conference on Computer Vision and Pattern Recognition Workshops, (2013), 472-478.
Cheng, Yu, et al., "Graph and Temporal Convolutional Networks for 3D Multi-person Pose Estimation in Monocular Videos", arXiv:2012.11806v3, (2021), 15 pgs.
Dyabin, Evgeny, "Cascadeur: character's pose prediction using 6 points", Informa PLC Informa UK Limited, (Oct. 2, 2019), 14 pgs.
Fragkiadaki, Katerina, et al., "Recurrent Network Models for Human Dynamics", Proceedings of the IEEE International Conference on Computer Vision (ICCV '15), (2015), 4346-4354.
Grochow, Keith, et al., "Style-Based Inverse Kinematics", To appear in ACM Trans. on Graphics (Proc. SIGGRAPH'04), (2004), 10 pgs.
Guler, Riza Alp, et al., "DensePose: Dense Human Pose Estimation in the Wild", arXiv:1802.00434v1, (Feb. 2018), 12 pgs.
Han, Fei, "Space-Time Representation of People Based on 3D Skeletal Data: A Review", Computer Vision and Image Understanding. arXiv:1601.01006v3, (2017), 25 pgs.
Harvey, Felix, et al., "Robust Motion In-betweening", ACM Trans. Graph., vol. 39, No. 4, Article 60, (2020), 12 pgs.
Heindl, Christoph, et al., "Metric Pose Estimation for Human-Machine Interaction Using Monocular Vision", arXiv:1910.03239v1, (2019), 2 pgs.
Holden, D, "Learned Motion Matching", ACM Transactions on Graphics (TOG), 39(4), (2020), 13 pgs.
Holden, D, et al., "Learning an Inverse Rig Mapping for Character Animation", Proceedings of the 14th ACM SIGGRAPH / Eurographics Symposium on Computer Animation, (2015), 165-173.
Holden, Daniel, et al., "Phase-Functioned Neural Networks for Character Control", ACM Transactions on Graphics, vol. 36, No. 4, (Jul. 2017), 13 pgs.
Holden, Daniel, et al., "Robust solving of optical motion capture data by denoising", ACM Transactions on Graphics, vol. 38, No. 1, Article 165, (2018), 12 pgs.
Hussein, Mohamed, et al., "Human Action Recognition Using a Temporal Hierarchy of Covariance Descriptors on 3D Joint Locations", Proceedings of the Twenty-Third International Joint Conference on Artificial Intelligence, (2013), 7 pgs.
Ijjina, Earnest, et al., "Classi?cation of human actions using pose-based features and stacked auto encoder", Pattern Recognition Letters, 83, (2016), 268-277.
Jain, Ashesh, "Structural-RNN: Deep Learning on Spatio-Temporal Graphs", arXiv:1511.05298v3, (2016), 10 pgs.
Kenwright, Ben, "Inverse Kinematics—Cyclic Coordinate Descent (CCD)", The Journal of Graphics Tools, vol. 16, No. 4, (2012), 277-217.
Khapugin, Evgeniy, et al., "Physics-Based Character Animation With Cascadeur", ACM SIGGRAPH 2019 Studio, (2019), 2 pgs.
Kim, Hyounghun, et al., "FIXMYPOSE: Pose Correctional Captioning and Retrieval", arXiv:2104.01703v1, (2021), 81 pgs.
Kumar, Chandan, et al., "VRU Pose-SSD: Multiperson Pose Estimation for Automated Driving", Association for the Advancement of Artificial Intelligence, (2021), 8 pgs.
Lecun, Yann, et al., "Deep learning", Nature, vol. 521. 7553, (2015), 436-444.
Lee, Kyungho, et al., "Interactive Character Animation by Learning Multi-Objective Control", ACM Transactions on Graphics, vol. 37, No. 6, Article 180, (Nov. 2018), 10 pgs.
Lin, James, et al., "Temporal IK: Data-Driven Pose Estimation for Virtual Reality", Technical Report No. UCB/EECS-2019-59, [Online]. Retrieved from the Internet: <URL: http://www2.eecs.berkeley.edu/Pubs/TechRpts/2019/EECS-2019-59.html>, (May 17, 2019), 33 pgs.
Luan, Tianyu, et al., "PC-HMR: Pose Calibration for 3D Human Mesh Recovery from 2D Images/Videos", Association for the Advancement of Artificial Intelligence, (2021), 9 pgs.
McDonald, Kyle, "Dance x Machine Learning: First Steps", Medium, [Online]. Retrieved from the Internet: <URL: https://kcimc.medium.com/discrete-?gures-7d9e9c275c47>, (Oct. 8, 2018), 24 pgs.
Mehta, Dushyant, et al., "XNect: Real-time Multi-Person 3D Motion Capture with a Single RGB Camera", ACM Trans. Graph., vol. 39, No. 4, Article 1. arXiv:1907.00837v2, (Jul. 2020), 24 pgs.

(56) References Cited

OTHER PUBLICATIONS

Mirzaei, Maryam, et al., "ANIMGAN: A Spatiotemporally-Conditioned Generative Adversarial Network for Character Animation", arXiv:2005.11489v1, (2020), 5 pgs.

Ofli, Ferda, et al., "Sequence of the Most Informative Joints (SMIJ): A New Representation for Human Skeletal Action Recognition", IEEE Computer Society Conference on Computer Vision and Pattern Recognition Workshops, (2012), 6 pgs.

Paul, Richard, "Robot Manipulators: Mathematics, Programming, and Control", The MIT Press, (1981), 291 pgs.

Pavilo, Dario, et al., "QuaterNet: A Quaternion-based Recurrent Model for Human Motion", BMVC, (2018), 14 pgs.

Rempe, Davis, et al., "Contact and Human Dynamics from Monocular Video", ACM SIGGRAPH / Eurographics Symposium on Computer Animation, vol. 39, No. 8, (2020), 3 pgs.

Riaz, Qaiser, et al., "Motion reconstruction using very few accelerometers and ground contacts", Graphical Models, 79, (2015), 16 pgs.

Rosenhahn, Bodo, et al., "Markerless Motion Capture of Man-Machine Interaction", CVPR, (2008), 8 pgs.

Sadegh, Seyed, et al., "Real-time Deep Pose Estimation with Geodesic Loss for Image-to-Template Rigid Registration", arXiv:1803.05982v4, (2018), 12 pgs.

Schwarz, Julia, et al., "Combining Body Pose, Gaze, and Gesture to Determine Intention to Interact in Vision-Based Interfaces", CHI, (2014), 11 pgs.

Starke, Sebastian, et al., "Local Motion Phases for Learning Multi-Contact Character Movements", ACM Trans. Graph., vol. 39, No. 4, Article 1, (Jul. 2020), 14 pgs.

Tautges, Jochen, et al., "Motion Reconstruction Using Sparse Accelerometer Data", ACM Transactions on Graphics (ToG), 30(3), (2011), 12 pgs.

Vaswani, Ashish, et al., "Attention is All You Need", 31st Conference on Neural Information Processing Systems (NIPS), arXiv:1706.03762v5 [cs.CL], (Dec. 6, 2017), 15 pgs.

Vemulapalli, R, et al., "Rolling Rotations for Recognizing Human Actions from 3D Skeletal Data", IEEE Conference on Computer Vision and Pattern Recognition, (2016), 10 pgs.

Xia, Lu, et al., "View Invariant Human Action Recognition Using Histograms of 3D Joints", IEEE Computer Society Conference on Computer Vision and Pattern Recognition Workshops, (2012), 8 pgs.

Xiang, Donglai, "Monocular Total Capture: Posing Face, Body, and Hands in the Wild", arXiv:1812.01598v1, (2018), 17 pgs.

Xu, Zhan, et al., "RigNet: Neural Rigging for Articulated Characters", ACM Trans. Graph., vol. 39, No. 4, (2020), 14 pgs.

Yan, Sijie, et al., "Spatial Temporal Graph Convolutional Networks for Skeleton-Based Action Recognition", Proceedings of the AAAI conference on artificial intelligence, vol. 32. arXiv:1801.07455v2, (2018), 10 pgs.

Yang, Xiaodong, et al., "EigenJoints-based Action Recognition Using Naïve-Bayes-Nearest-Neighbor Xi", IEEE Computer Society Conference on Computer Vision and Pattern Recognition Workshops, (2012), 6 pgs.

Zhang, He, et al., "Mode-Adaptive Neural Networks for Quadruped Motion Control", ACM Trans. Graph., vol. 37, No. 4, Article 145, (Aug. 2018), 12 pgs.

Zhang, Songyang, et al., "On Geometric Features for Skeleton-Based Action Recognition using Multilayer LSTM Networks", Conference: IEEE Winter Conference on Applications of Computer Vision, (2017), 10 pgs.

* cited by examiner

SYSTEM AND METHOD FOR GENERATING CHARACTER POSES USING DEEP LEARNING

CROSS-REFERENCE TO RELATED APPLICATIONS

This application is a continuation of and claims the benefit of priority under 35 U.S.C. § 120 to U.S. patent application Ser. No. 17/326,211, filed on May 20, 2021, which claims the benefit of U.S. Provisional Application No. 62/706,729, filed Sep. 4, 2020, entitled "SYSTEM AND METHOD FOR GENERATING CHARACTER POSES USING DEEP LEARNING," each of which is incorporated by reference herein in its entirety.

TECHNICAL FIELD

The subject matter disclosed herein generally relates to the technical field of computer animation, and in one specific example, to computer animation systems and methods for generating and modifying animation poses for a virtual character.

BACKGROUND OF THE INVENTION

In 3D animation software, various tools exist for positioning virtual characters. Manually posing a character by directly manipulating bones is a painful task as a character skeleton may include hundreds of bones. Animating a character is generally done through a rig, which is a set of controls or "effectors" used to control the skeleton of the character in a convenient and expressive way by an animator. Rigging a character generally requires much work since each control has to be designed and parameterized. Inverse kinematic (IK) solvers are also used to solve for skeleton joint positions (e.g., based on constraint solving and physics), but in many cases, IK is limited to bone chains, and often only two-bones chains. Full-body IK solvers exist, but also require parameterization (e.g., such as providing twist or swing constraints, including limits per joint, etc.). In some cases, the IK solvers may provide physically-plausible poses, but not necessarily natural-looking poses.

BRIEF DESCRIPTION OF THE DRAWINGS

Features and advantages of example embodiments of the present disclosure will become apparent from the following detailed description, taken in combination with the appended drawings, in which.

It will be noted that throughout the appended drawings, like features are identified by like reference numerals.

DETAILED DESCRIPTION

Figure 1:
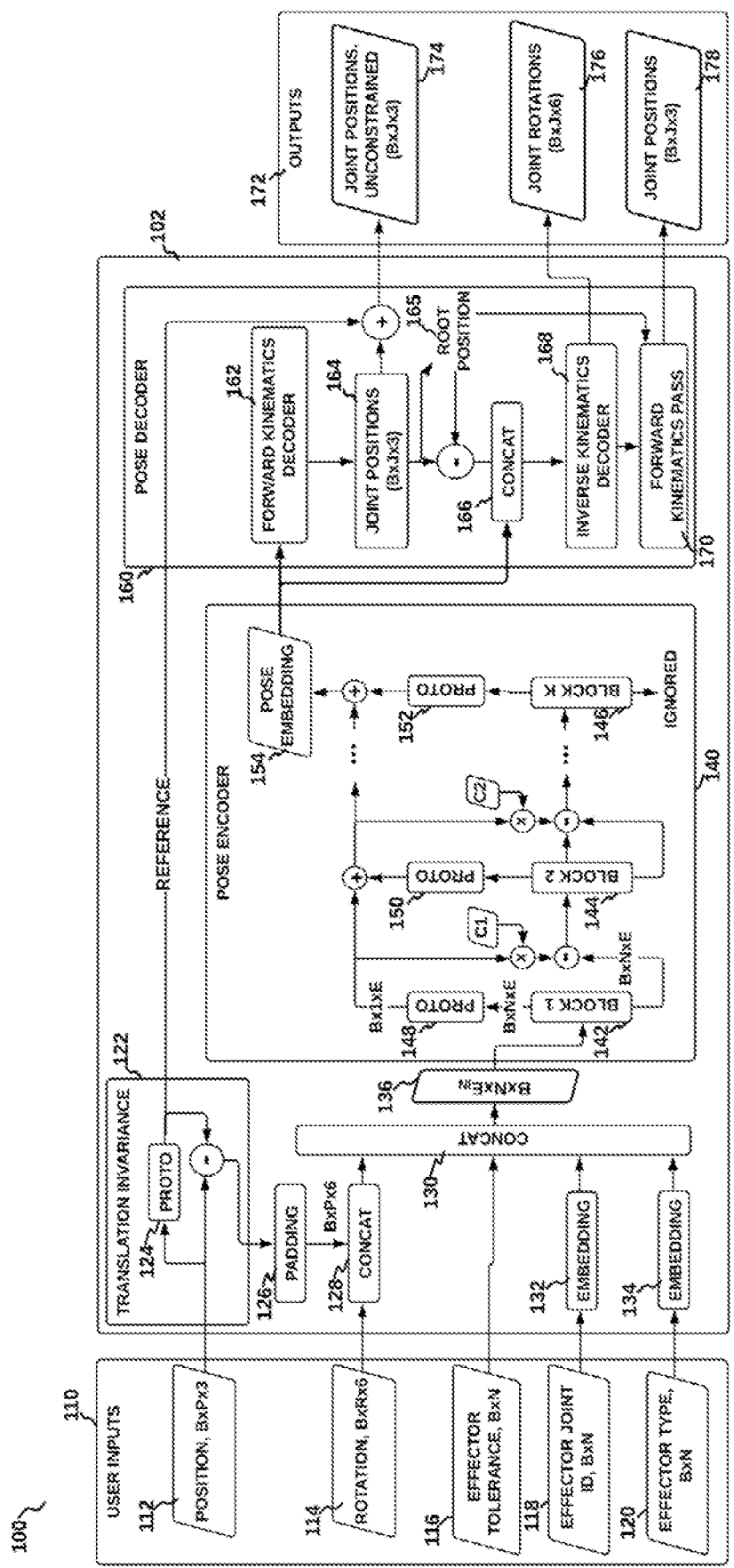
FIG. 1 is an architecture for a ML pose prediction system, in accordance with an embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any digital object or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during an execution of the game).

The term 'build' and 'game build' used throughout the description herein should be understood to include a compiled binary code of a game which can be executed on a device, and which, when executed can provide a playable version of the game (e.g., playable by a human or by an artificial intelligence agent).

The terms 'client' and 'application client' used throughout the description herein are understood to include a software client or software application that can access data and services on a server, including accessing over a network.

Throughout the description herein, the term "agent" and "AI agent" should be understood to include entities such as a non-player character (NPC), a robot, and a game world which are controlled by an artificial intelligence system or model.

Throughout the description herein, the term 'mixed reality' (MR) should be understood to include all combined environments in the spectrum between reality and virtual reality (VR) including virtual reality, augmented reality (AR) and augmented virtuality.

A method of generating or modifying poses in an animation of a character are disclosed. Variable numbers and types of supplied inputs are combined into a single input. The variable numbers and types of supplied inputs correspond to one or more effector constraints for one or more joints of the character. The single input is transformed into a pose embedding. The pose embedding includes a machine-learned representation of the single input. The pose embedding is expanded into a pose representation output. The pose representation output includes local rotation data and global position data for the one or more joints of the character.

The present disclosure includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations.

The systems and methods described herein include one or more components or operations that are non-routine or unconventional individually or when combined with one or more additional components or operations, for generating animation poses with deep machine learning using a machine learning (ML) pose prediction system in accordance with embodiments of the invention. In accordance with an embodiment, the ML pose prediction system 100 may be implemented within an application 210 or module within an application layer 320 as shown in FIG. 3 (details of FIG. 3 are described below). The systems and methods described herein provide a number of valuable benefits to digital content creators since creating high-quality character animation is difficult and expensive. Games that exhibit high-quality animations are typically high-budget productions that can afford expert animators, usually having access to high-end animation software. The systems and methods described herein can provide the benefit of simplifying generation of high quality animations (e.g., in computer games) by allowing non-expert animators (e.g., and even non-animators) to create high quality animations. The systems and methods described herein can provide the benefit of a generic solution that can be applied to any type of character (e.g., human, dog, octopus, snake, etc.), and does not require manual intervention when switching between types. The systems and methods described herein, and particularly with the use of domain specific input data (as described below) can provide the benefit of producing natural-looking poses. In addition, the ML pose prediction system 100s and methods described herein can be implemented as a component in a system for pose estimation and/or classification operating on a monocular video (e.g., in order to improve a quality of pose estimation and/or classification). In accordance with an embodiment, the ML pose prediction system 100 may be used as a component within a secondary system because the ML pose prediction system 100 uses an architecture that accepts (e.g., as input) a variable number and type of effector inputs and operates without requiring novel training (e.g., without requiring additional machine learning training due to a different input combination of effectors) for an arbitrary combination of effector inputs. The ML pose prediction system 100 architecture is described in detail below with respect to FIG. 1, FIG. 2A, and FIG. 2B. For example, the ML pose prediction system 100 may be trained a first time using machine learning techniques, and require no additional machine learning training when presented with different combinations of effector inputs. Accordingly, it may be implemented within a postprocessing step of an additional system to improve realism and overall accuracy of pose estimation for the additional system.

In accordance with an embodiment, the systems and methods described herein provide an end-to-end solution for pose prediction: the ML pose prediction system 100 takes a variable number and type of input effectors and determines full body joint orientations without using an optimization process (e.g., after a machine learning prediction) that aligns all solid bodies and joints of a physical model.

Generating a Character Rig for the ML Pose Prediction System

In accordance with an embodiment, a rig is generated for a type of character, wherein the rig is a bone structure associated with a 3D model of the character, and wherein the rig is to be used by the ML pose prediction system 100 to pose the character. A type of character may be associated with a skeleton shape and configuration for the type (e.g., a bipedal human shaped animation skeleton for a human type character, a quadrupedal shaped animation skeleton for a dog type character, and the like). The systems and methods described herein can be applied to any type of character (e.g., to any shape or type of skeleton) including a bipedal human type, a quadrupedal type (e.g., dog, giraffe, elephant), other odd shaped types (e.g., octopus), and more. In accordance with an embodiment, a skeleton may include a hierarchical set of joints and may also include constraints on the joints (e.g., length of bones between joints, angular constraints, and more) which may provide a basic structure for the skeleton. For example, the systems and methods described herein do not use anything specifically limited to a single type of skeleton (e.g., the human body), nor do the systems and methods use any hard-coded constraints which might limit application. As such, the systems and methods described herein can be applied for posing various shaped skeletons such as a dog, or an octopus. In accordance with an embodiment, the generating of a rig may include generating an associated set of effectors for the rig, whereby each effector in the set can be used (e.g., by a machine learning system) to pose a part of a character via the rig. In accordance with an embodiment, effectors do not define a pose of a character, they provide constraints for a variable number of joints for which a final pose (e.g., at the output of the ML pose prediction system 100) must satisfy. In accordance with an embodiment, there may be a small number of effectors defined as an input to the ML pose prediction system 100 (e.g., describing constraints for a small number of associated joints), and whereby the system 100 would determine a pose to satisfy the small number of effector constraints (e.g., the system 100 may find a representation (e.g., a pose embedding described below) for a pose that satisfies the effectors, and then generates a final character pose based on the pose embedding). In accordance with an embodiment, an effector of the set of effectors may be of a type, with the types of effectors including a positional effector, a rotational effector, and a look-at effector as described below:

Positional: In accordance with an embodiment, a positional effector includes data describing a position in a world space (e.g., world space coordinates). A positional effector can include subtypes:

Joint effector: In accordance with an embodiment, a joint effector may be a subtype of a positional effector that represents a position of a joint for a character (e.g., such as a desired position for a left foot of bipedal character). In accordance with an embodiment, a joint effector may be a restraint imposed on a joint of a character which forces the joint to occupy the position defined therein.

Reach effector: In accordance with an embodiment, a reach effector is a subtype of a positional effector that represents a desired target position in a world space (e.g., a target 'future' position for a joint effector). In accordance with an embodiment, a reach effector may be associated with a specific joint or joint effector, and may indicate a desired position for the joint. In accordance with an embodiment, a reach effector may not be associated with a specific joint or joint effector, but may indicate a desired position for a part of a character (e.g., a desired position for a left hand of a character to grab or point at).

look-at effector: In accordance with an embodiment, a look-at effector is an effector type that includes a 3D position which represents a desired target position in a world space for a joint, wherein the joint is forced (e.g., by the ML pose prediction system 100) to orient itself towards the desired target position (e.g., the joint is forced to "look at" the target position). In accordance with an embodiment a look-effector provides an ability to maintain a global orientation of a joint towards a particular global position in a scene (for example, looking at a given object). The look-at effector is generic in that it allows a model of a neural network architecture 102 within the ML pose prediction system 100 (the neural network architecture 102 described below with respect to FIG. 1) to align any direction within a joint (e.g., expressed in a local frame of reference), towards a global target location. In accordance with an embodiment, the look-at effector may include data describing the following: a 3D point (e.g., the desired target position), a joint (e.g., a specified joint within a character which must target the desired target position), and a specified axis of the joint which must orient itself to the 3D point (e.g., an axis of the joint which is forced by the ML pose prediction system to point at the 3D point, wherein the axis may be defined with any arbitrary unit-length vector defining an arbitrary local direction). In accordance with an embodiment, and during a training of the neural network architecture 102, the network architecture 102 may be provided with a look-at effector (e.g., including a 3D point in an environment and a specified joint in a character), and may learn to generate a pose of the character wherein the specified joint will additionally satisfy a requirement to look at (e.g., point towards) the 3D point.

Rotational effector: In accordance with an embodiment, a rotational effector may include directional data (e.g., such as a direction vector or an amount and direction of rotation). For example, a directional effector may include a vector specifying a gaze direction, a running velocity, a hand orientation, and the like. In accordance with an embodiment, a rotational effector may include data which describes a local rotation or local direction which is described relative to an internal coordinate system of a character (e.g., a rotation relative to a character rig or relative to a set of joints for the character). In accordance with an embodiment, a rotational effector may include data which describes a global rotation or global direction which is described relative to a coordinate system which is external to the character (e.g., a rotation relative to a coordinate system external to a character rig or external to a set of joints for the character).

While positional, rotational, and look-at types are described above, embodiments of this present disclosure are not limited in this regard. Other effector types may be defined and used within the ML pose prediction system 100 without departing from the scope of this disclosure.

In accordance with an embodiment, an effector within the ML pose prediction system 100 includes associated embedded data which represents semantic information for the effector. A semantic meaning (e.g., encoded via an embedding) may be learned by machine learning techniques (e.g., including training and data augmentation as described herein) by the ML pose prediction system 100 (e.g., via a neural network therein, including the pose encoder 140 described below with respect to FIG. 1), wherein the semantic meaning may include an intended use of an effector. The embedded data may enable online programmability of a neural network architecture (e.g., the neural network architecture 102 shown in FIG. 1) within the ML pose prediction system 100 without requiring a retraining, wherein the online programmability refers to an ability to program the neural network for a new task without a requirement to retrain the neural network. For example, this may include an ability to process a first input that includes a first set of effectors with a first number and type, and to process a second input that includes a second set of effectors with a second number and type, wherein the processing of the first input and the second input are performed with the neural network without any retraining between the processing. The first set of effectors and the second set of effectors may be provided by an external input (e.g., an input of a user via a joystick, mouse, screen tap or other). For example, a user may specify a position for a hand, then provide a hip position, then provide a look-at position for a face, wherein the ML pose prediction system 100 can produce a new output pose based on the variable input over time. In accordance with an embodiment, the embedded data may be appended (e.g., within a vector data structure) to coordinate data, angle data, or other data associated with the effector.

In accordance with an embodiment, during a training of a neural network within the ML pose prediction system 100 (e.g., the neural network architecture 102 shown in FIG. 1) and during an operation of a trained version of the neural network, an associated embedding for a joint effector may be used by the neural network within the ML pose prediction system 100 as an identifier (e.g., to determine which specific joint within a character is being processed).

In accordance with an embodiment, the embedded data associated with an effector includes data describing a type for the effector (e.g., wherein types may be described as above: positional, look-at, and directional). In accordance with an embodiment, the embedded type data may be appended to the effector data (e.g., within a vector data structure) so that during training and during operation (e.g., after a training), the neural network within the ML pose prediction system 100 (e.g., the neural network architecture 102 shown in FIG. 1) is aware of a type of effector it is processing.

In accordance with an embodiment, the embedded data associated with an effector includes data describing a weight of the effector, wherein the weight describes a relative importance of the effector when compared to other effectors. In accordance with an embodiment, during training and during operation (e.g., after a training), a neural network within the ML pose prediction system 100 (e.g., the neural network architecture 102 shown in FIG. 1) may use weight embedded data for an effector to determine a weighting of data associated with the effector (e.g., to determine a weighting of embedded data when using said data within the neural network described in FIG. 1, FIG. 2A, and FIG. 2B). In accordance with an embodiment, as used during training and operation, the weight embedded data provides additional programmability to control a level of importance for each effector.

In accordance with an embodiment, the neural network within the ML pose prediction system 100 (e.g., the neural network architecture 102 shown in FIG. 1) derives a set of parameters for one or more effectors using machine learning techniques. This may include determining how one or more effectors interact with a full body skeleton using machine learning techniques (e.g., during training). For example, this may include determining constraints (e.g., parameterization) using input data, such as twist or swing limits per joint, etc.

Architecture:

In accordance with an embodiment, and shown in FIG. 1 is a neural network architecture 102 for a pose prediction system 100. The neural network architecture 102 includes an encoder (e.g., a pose encoder 140) followed by a decoder (e.g., a pose decoder 160) and generates an output prediction 172 from a set of inputs 110. As shown in FIG. 1, the neural network architecture 102 may generate the output 172 in a plurality of steps. In accordance with an embodiment, in a first step of the plurality of steps, a variable number and type of user supplied inputs may be processed, embedded (described below), and combined (e.g., concatenated 130) into a single input 136 (e.g., a single input matrix) for the pose encoder 140. The processing may include a processing for translation invariance 122, padding 126, concatenation 128, and the like. The neural network architecture 102 is flexible in that it accepts a variable number and type of effector for each joint of a character. For example, any joint within an input character may have zero or more associated inputs, and an associated input may include one or more different types (e.g., a first joint may be constrained by user-specified 3D position coordinates and global rotation, while a second joint may be constrained with a look-at effector). In accordance with an embodiment, in a second step of the plurality of steps, the pose encoder 140 may transform the pose specified via effectors (e.g., the input 136) into a single vector encoding of a pose (e.g., a pose embedding 154). In accordance with an embodiment, in a third step of the plurality of steps, the posed decoder 160 may expand the pose embedding 154 into a full pose representation output 172 including local rotation data 178 and global position data 176 for each input joint.

In accordance with an embodiment, the translation invariance 122 may include a re-referencing of input positions relative to a centroid of input positional effectors to achieve translation invariance. The translation invariance 122 may simplify a handling of poses in global space while not relying on a precise reference frame, which can be difficult to define for heterogeneous MOCAP sources.

In accordance with an embodiment, the neural network architecture 102 does not require input to follow any specific scheme or that it be fully-specified. Instead, the neural network architecture 102 allows for complete flexibility of defining a character pose by accepting a variable number of inputs of different types. Accordingly, the neural network architecture 102 accepts any combination of input 110 that includes position effectors (3D coordinates), rotation effectors (with any 6DoF representation) and look-at effectors (3D coordinates). In accordance with an embodiment, and shown in FIG. 1, an input effector may include data for position 112 and rotation 114. In accordance with an embodiment, for mathematical convenience, input rotation data 114 may be in a 6 degree of freedom (6DoF) format that is described with six values. In accordance with an embodiment, input position data 112 (e.g., 3D position or look-at coordinates) may be padded (e.g., by adding 3 zero values at operation 126) so that the input position data and the input rotation data 114 are the same length when provided to the pose encoder 140. In accordance with an embodiment, each effector may be further characterized by tolerance data 116, joint ID 118, and type 120. Tolerance may be a positive floating point value. A smaller tolerance value implies that an effector value has to be more strictly reproduced in a reconstructed output pose (e.g., within the output 172). Joint ID for an effector may be a value (e.g., an integer) indicating which joint is affected by the effector. Effector type may be a value (e.g., an integer) indicating a positional, rotational, or look-at effector (e.g., for positional effector type='0', for rotational effector type='1', and for rotational effector type='2'). In accordance with an embodiment, categorical variables (type 120 and joint ID 118) may be embedded into a continuous vector and may also be concatenated with the effector data (position 112 or rotation 114), resulting in an input 136 to the pose encoder 140 being an matrix (e.g., a matrix with size $N \times E_{in}$) with a number of rows (e.g., N rows as shown in FIG. 1) corresponding to a number of input effectors and a number of columns (e.g., $E_{in}$ columns as shown in FIG. 1) corresponding to a combined dimension (e.g., an embedding dimensionality) of all categorical variable embeddings plus 6 DoF effector input dimensions (e.g., either padded position data 112 or rotation data 114). In accordance with an embodiment, as shown in FIG. 1, a variable 'B' may denote a batch dimension for the input 110.

In accordance with an embodiment, the pose encoder 140 may be a multi-stage residual neural network with residual links of forward and backward types interleaved with prototype layers (148, 150, and 152) of the forward links. In accordance with an embodiment, the pose encoder may applying a machine-learned model based on a fully-connected residual neural network architecture depicted in FIG. 1 (e.g., within the pose encoder 140) and FIG. 2B. In accordance with an embodiment, a prototype layer may be defined as a mean over the leading (effector) dimension of its input. Each stage of the pose encoder 140 corresponds to one residual block. The structure within a block is described below with respect to FIG. 2B. The residual links may provide several benefits, including: (i) improving gradient flow and increasing network depth and (ii) achieving an interaction of encodings of individual joints with an encoding of an entire pose created at each encoder stage.

In accordance with an embodiment, as can be seen in FIG. 1, a forward encoding of individual effectors is collapsed into a representation of a complete pose 154 via prototype layers. The representation of a complete pose 154 may be accumulated across a plurality of residual blocks (142, 144, 146) to form a final pose representation 154 as an output of the pose encoder 140. In accordance with an embodiment, constant factors C1 and C2 may serve a purpose of aligning scales of a residual link from a block (e.g., 238 from FIG. 2B) and a global prototype anion of a pose (e.g., 154).

Decoder

In accordance with embodiment, the pose decoder 160 may include two separate modules, both of which may be configured as a fully-connected residual (FCR) neural network architecture depicted in FIG. 2A and FIG. 2B described below. In accordance with an embodiment, a first module 162 of the two modules may be a global position decoder (GPD), wherein the GPD 162 predicts the internal pose representation 154 generated by the pose encoder 140 directly into an unconstrained prediction of 3D joint positions. The prediction by the global position decoder may be generated by applying a machine learned model based on a fully-connected residual neural network architecture depicted in FIG. 2A and FIG. 2B. In accordance with an embodiment, the output joint positions 164 may form a draft pose, in which bone constraints are not necessarily respected. In accordance with an embodiment, a second module 168 of the two modules may be an inverse kinematics decoder (IKD), wherein the inverse kinematics decoder 168 predicts internal geometric parameters (e.g., local rotation angles or joint rotations 178) of the skeleton kinematic system. The prediction by the inverse kinematics decoder may be generated by applying a machine learned model based on a fully-connected residual neural network architecture depicted in FIG. 2A and FIG. 2B. In accordance with an embodiment, the inverse kinematic decoder 168 accepts a concatenation of (i) the pose embedding 154 generated by the pose encoder 140 and (ii) the (unconstrained) joint position predictions 164 generated by the global position decoder 162. In accordance with an embodiment, the inverse kinematic decoder predicts the local rotations 178 of the skeleton joints that when subjected to predefined skeleton kinematic equations generate feasible coordinates of all joints.

Global Position Decoder: GPD

In accordance with an embodiment, based on the GPD 162 producing joint position predictions 164 without relying on skeleton constraints, the predictions may not respect skeleton topology and may not be physically feasible. The purpose of the GPD 162 module may be two-fold. First, the task of predicting unconstrained joint positions 164 may provide a task for generating a meaningful pose embedding. Second, the GPD module 162 may generate a reference point for the inverse kinematics decoder 168.

In accordance with an embodiment, the inverse kinematics decoder module 168 generates local joint rotations 178 based on positions defined in global space. In order for the IKD 168 to provide correct rotations, an origin of the kinematic chain in world space must be provided to the IKD 168, and the output of the GPD 162 provides this data.

Inverse Kinematics Decoder (IKD)

In accordance with an embodiment, the IKD 168 may accept a concatenation of (i) the pose embedding 154 generated by the pose encoder 140 and (ii) the predicted joint positions 164 (e.g., a pose draft) predicted by the GPD module 162. In accordance with an embodiment, the IKD 168 may predict (e.g., using the concatenated input) the local rotation angles 178 of each joint. In accordance with an embodiment, the predicted local rotation angles 178 may also be processed via a forward kinematics pass 170, which generates a global (e.g., and physically feasible) coordinates 176 of skeletal joints and global joint rotations. The forward kinematics pass is further described in more detail below.

Forward Kinematics Pass

In accordance with an embodiment, the forward kinematics pass 170 operates on the output 178 of the IKD 168 and translates the local joint rotations 178 and a global root position 165 into global joint rotations and global joint coordinates 176. The global root position may be data describing a position of a joint defined as a root joint (e.g., within the input 110) which may provide a reference point (e.g., an origin) for other joint positions within the input. In accordance with an embodiment, the global root position may be data describing a center of coordinates for the skeleton. In accordance with an embodiment, the translation operation of the forward kinematics pass 170 may be described by two matrices for each joint j, including an offset matrix and a rotation matrix, wherein the offset matrix of joint j provides displacements of the joint with respect to its parent joint along coordinates x, y, z when a rotation of joint j is zero. In accordance with an embodiment, the translation operation may use skeleton kinematic equations. In accordance with an embodiment, the offset matrix may be a fixed non-learnable matrix that describes bone length constraints for a skeleton. In accordance with an embodiment, the rotation matrix may be represented using Euler angles. However, in another embodiment, a more robust representation based on 6 element vectors predicted by the IKD module 168 may be used.

In accordance with an embodiment, the forward kinematics pass 170 takes the global root position 165 and rotation matrices of a plurality of joints as output by the IKD module 168 and generates a global rotation and global position of a joint of the plurality of joints by following a tree recursion from a parent joint of the joint.

In accordance with an embodiment, a global position and rotation matrix output for a joint (e.g., the output 178 of the forward kinematics pass 170) may be a complete 6DOF prediction of the joint, including both global position and global rotation of the joint with respect to a center of coordinates for the skeleton.

Figure 2A:
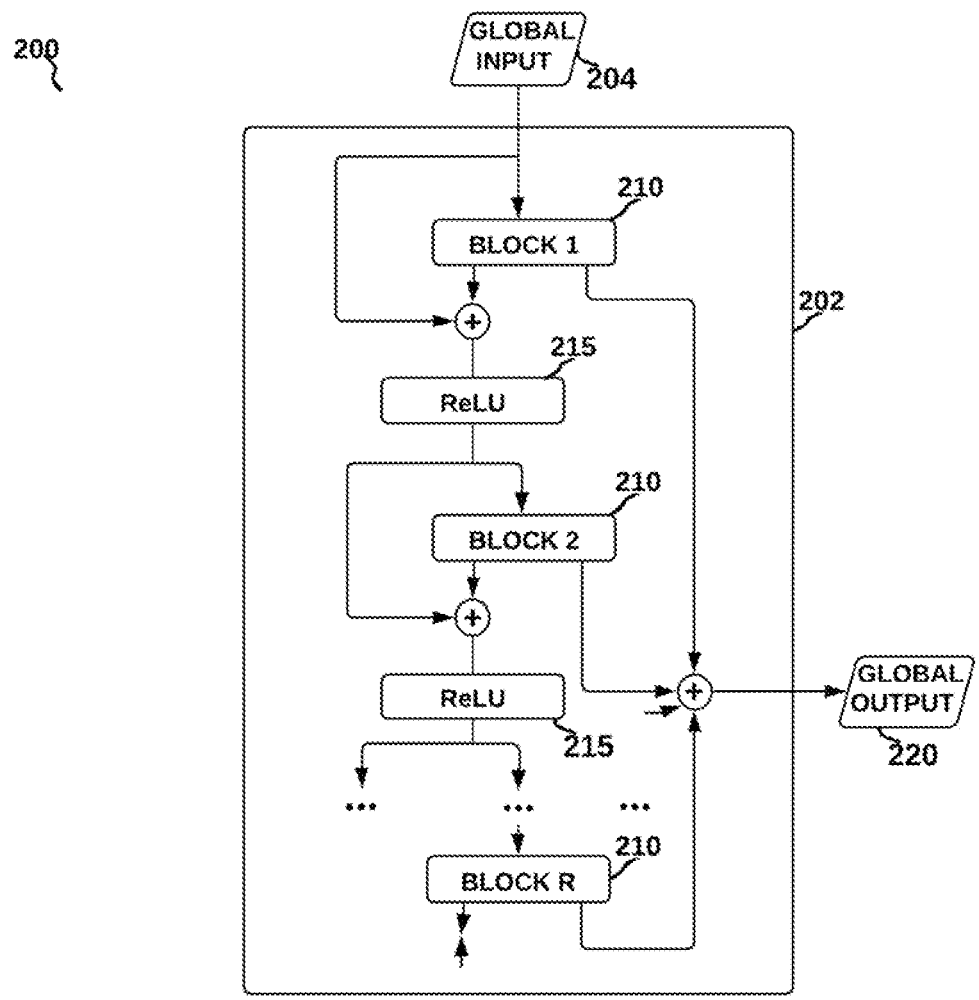
FIG. 2A is schematic of a neural network architecture used for a decoder within a ML pose prediction system, in accordance with an embodiment.

In accordance with an embodiment, and shown in FIG. 2 is a schematic diagram of a neural network architecture 202 which may be used within the global position decoder 162 and the inverse kinematics decoder 168. In accordance with an embodiment, the neural network architecture 202 has a fully connected residual neural network topology consisting of a plurality of fully connected blocks 210 connected using residual connections. In accordance with an embodiment, a block 210 may have a layer norm at the input and a fork at the output. A first output of the fork may produce a contribution to a global output 220 of the neural network architecture 202. A second output of the fork may contribute to a residual connection a next block 210, wherein the residual connection may additionally be processed by a non-linear rectifier function 215 (e.g., a ReLU non-linearity). As; shown in FIG. 2A, there may be any number of layers consisting of a block 210, an activation function 215 and a residual connection.

Figure 2B:
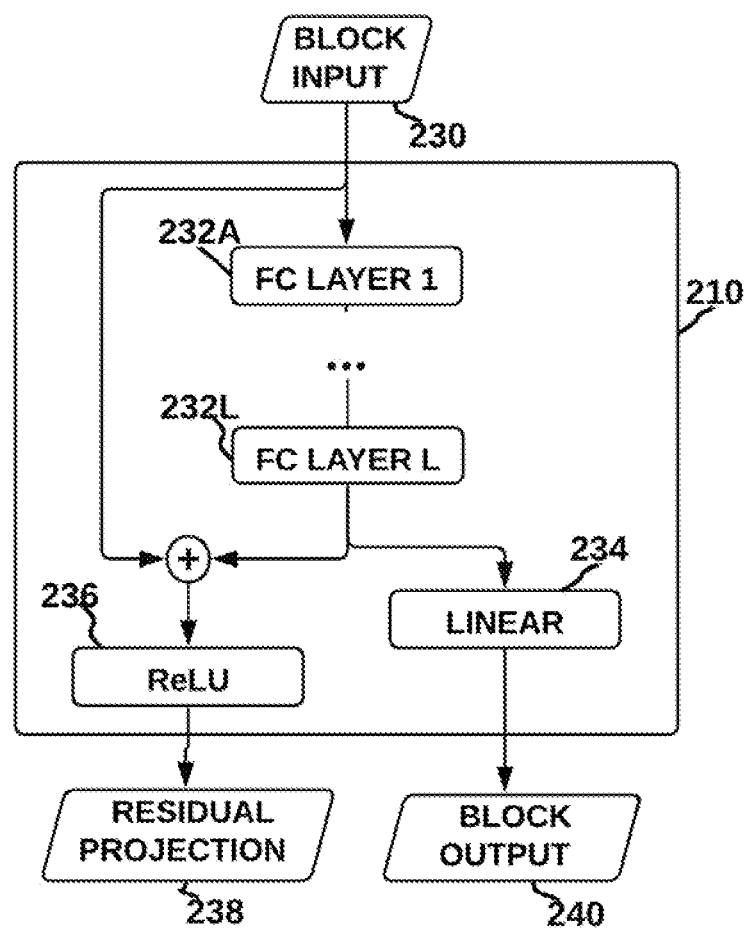
FIG. 2B is a schematic of a neural network block structure used within the ML pose prediction system, in accordance with an embodiment.
Figure 3:
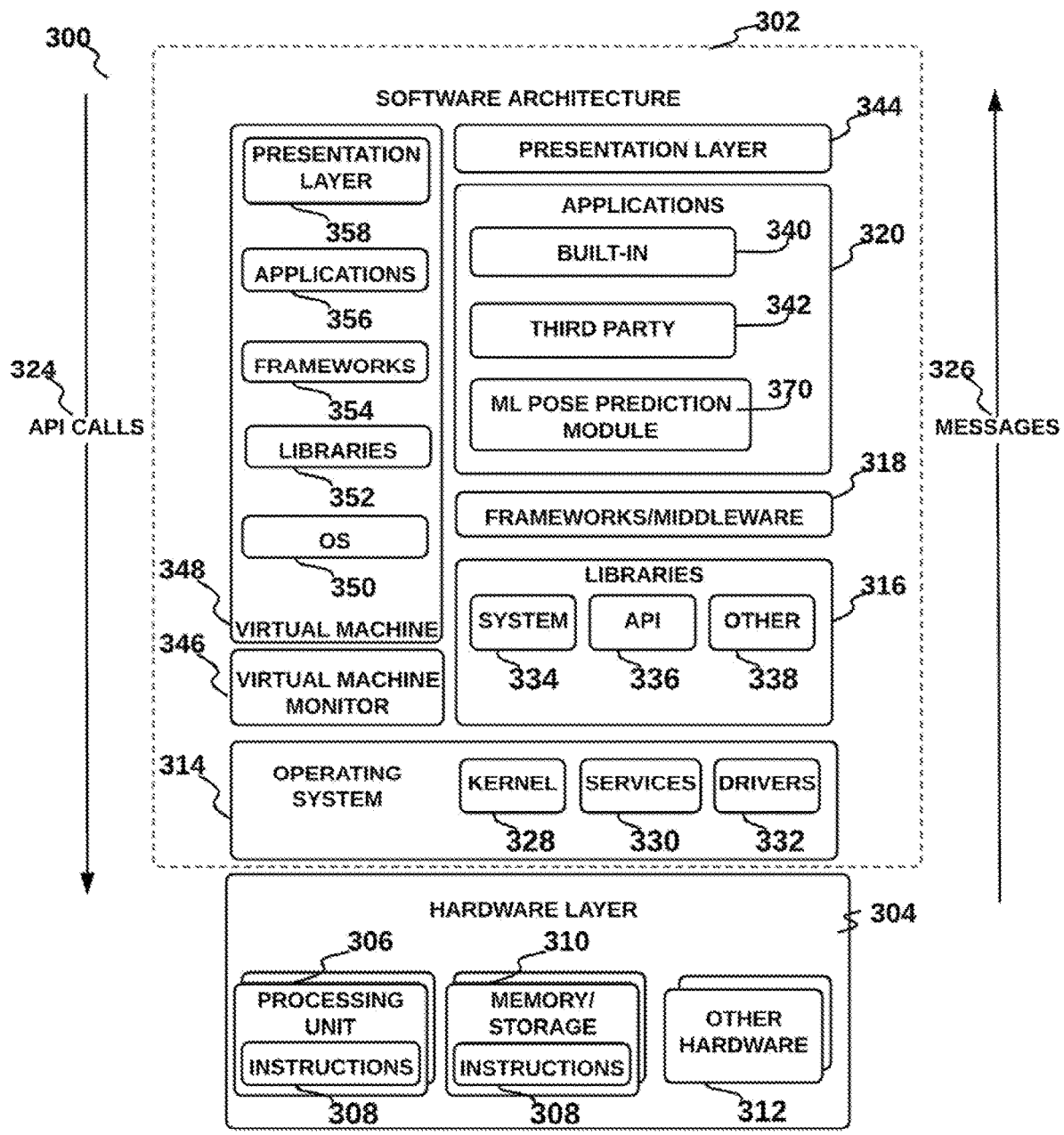
FIG. 3 is a block diagram illustrating an example software architecture, which may be used in conjunction with various hardware architectures described herein.

In accordance with an embodiment, FIG. 2B shows a neural network architecture within a block 210. In accordance with an embodiment, an input 230 to the block 210 may pass through a plurality of fully connected layers 232A, 232L and more (collectively 232). In accordance with an embodiment, an output from a final layer 232L may pass through an activation function 234 to produce a block output 240. The activation function 234 may be linear or non-linear. In accordance with an embodiment, a residual projection 238 may be created by combining an output from the final layer 232L with the block input 230 and processing the combination with an activation function 236. The activation function may be linear or non-linear (e.g., a ReLU activation function).

Losses within the Neural Network Architecture 102

In accordance with an embodiment, three loss types may be used during a training of the neural network architecture 102 in a multi-task fashion. Individual loss terms may be combined additively (e.g., with loss weight factors for each) into a total loss term. The loss weight factors may be chosen to make sure that magnitudes of different loss terms have a same order of magnitude. A loss function combining rotation and position error terms via randomized weights based on randomly generated effector tolerance levels may be used.

In accordance with an embodiment, an L2 loss may be used as a loss type to penalize errors of 3D position predictions. The L2 loss may be defined as a mean squared error between a prediction and ground truth. In accordance with an embodiment, the L2 loss may be used to supervise output of the GPD module 162 (e.g., predicted joint positions 164) by directly driving a learning process of GPD. In accordance with another embodiment, the L2 loss may be used to supervise the position output 176 of the forward kinematics pass 170 by indirectly driving a training of the IKD module 168, wherein the IKD module 168 learns to produce local rotation angles that result in joint position predictions with small L2 loss after IKD outputs are subjected to the forward kinematics pass 170.

In accordance with an embodiment, a geodesic loss may be used as a loss type to penalize errors in rotational output of the neural network architecture 102. Geodesic loss may represent the smallest arc (in radians) to go from one rotation to another over a surface of a sphere. The geodesic loss may be defined for a ground truth rotation matrix and its prediction. The geodesic loss may be used to supervise the rotation output 178 of the IKD module 168. The geodesic loss may directly drive a learning of the IKD module 168 by penalizing deviations with respect to a ground truth of local rotations of all joints.

In accordance with an embodiment, a combination of L2 loss and geodesic loss used when training the neural network architecture 102 may provide a benefit of allowing the neural network architecture 102 to learn a high-quality pose representation (e.g., as an output 172). The combination of L2 loss and geodesic loss may be particularly beneficial for the neural network architecture 102 when reconstructing a partially specified pose, wherein multiple reconstructions may be plausible. Using the combination of L2 loss and geodesic loss may help to train the neural network architecture 102 to simultaneously reconstruct plausible joint positions and plausible joint rotations. In accordance with an embodiment, the combined training of the neural network architecture 102 on L2 loss and Geodesic loss may result in a synergistic effect, wherein the architecture 102 model trained on both L2 loss and geodesic loss generalizes better on both losses than a model trained only on one of the loss terms.

In accordance with an embodiment, a look-at loss may be used as a loss type, wherein the look-at loss is associated with look-at effector. In accordance with an embodiment, the look-at loss drives a learning of the IKD module 168 by penalizing deviations of global directions computed after the forward kinematics pass 170 with respect to a ground truth of global directions.

Training

In accordance with an embodiment, each stage of a ML pose prediction system 100 is a fully-connected neural network trained for a specific task as described above. In accordance with an embodiment, the training for the specific task includes performing data augmentation on input data, and designing training criterion to improve results of the ML pose prediction system 100. In accordance with an embodiment, the training methodology described below includes a plurality of techniques to (i) regularize model training via data augmentation, (ii) teach the model to deal with incomplete and missing inputs and (iii) effectively combine loss terms for multi-task training. The data augmentation and the designing of training criterion is described below.

In accordance with an embodiment, a machine learning training process for the ML pose prediction system 100 requires as input a plurality of plausible poses for a type of character. In accordance with an embodiment, the plurality of plausible poses may be in the form of an animation clip (e.g., video clip). The input animation clips may be obtained from any existing animation clip repository (e.g., online video clips, proprietary animation clips, etc.), and may be generated specifically for the training (e.g., using motion capture).

In accordance with an embodiment, a ML pose prediction system 100 is trained for a type of character (e.g., requiring at least one ML pose prediction system 100 for posing per type of character). For example, there may be a ML pose prediction system 100 trained for human type characters, another ML pose prediction system 100 for dog type characters, another ML pose prediction system 100 for cat type characters, another ML pose prediction system 100 for snake type characters, and the like. The plurality of input poses to train an ML pose prediction system 100 can include any animation clips that include the type of character associated with the ML pose prediction system 100. For example, an ML pose prediction system 100 for human posing would require that the ML pose prediction system 100 is trained using animation clips of human motion; whereas, an ML pose prediction system 100 for octopus posing would require that the ML pose prediction system 100 is trained using animation clips of octopus motion.

In accordance with an embodiment, a ML pose prediction system 100 is trained for a domain specific context that includes specific motions associated with the context, including boxing, climbing, sword fighting, and the like. A ML pose prediction system 100 may be trained for a specific domain context by using input animations for training of the ML pose prediction system 100 that includes animations specific to the domain context. For example, training a ML pose prediction system 100 for predicting fighting poses should include using a plurality of input fighting animation sequences.

Data Augmentation

In accordance with an embodiment, data augmentation may be used to artificially augment a size of an input training set (e.g., the plurality of input poses), the augmenting providing for an almost infinite motion data input. During training of an ML pose prediction system 100, the data augmentation may include randomly translating and randomly rotating character poses in the plurality of input poses. The random translations may be performed in any direction. The addition of random translations of input poses may increase robustness of the ML pose prediction system 100 model by providing a greater range of input data. Furthermore, the addition of random translations can increase the possible applications of the ML pose prediction system 100 along with increasing the output quality of the ML pose prediction system 100 when posing a character. For example, the addition of random translations allows for the ML pose prediction system 100 to generate automatic body translation while generating a pose using a hierarchy of neural networks as described herein. For example, the ML pose prediction system 100 may generate a translation of a character in addition to providing a pose for the character in order to more closely match inputs (e.g., input effectors) to the generated output pose, since some generated poses may look more natural if accompanied by an additional translation. As a further example, consider a human character that includes input effectors describing position for the hands and feet, the addition of random translations during training will allow the ML pose prediction system 100 to predict a natural position of the character body in a world space from the input effectors of the hands and feet position. In accordance with an embodiment, the random rotations may only be performed around a vertical axis, as character poses are typically highly dependent on gravity. The addition of random rotation in input data is also important to train an ML pose prediction system 100 to learn automatic full or partial body rotation that may not be present in the original input data. Furthermore, the addition of random rotations also allows for the ML pose prediction system 100 to generate automatic body rotation while generating a pose using a hierarchy of neural networks as described herein. For example, the ML pose prediction system 100 may generate a rotation of a character in addition to providing a pose for the character in order to more closely match inputs (e.g., input effectors) to the generated output pose, since some generated poses may look more natural if accompanied by an additional rotation.

In accordance with an embodiment, the data augmentation may include augmentation based on selecting a plurality of different subsets of effectors as inputs (e.g. a first combination of hips and hands, a second combination could be head and feet, and the like). This leads to exponential growth in a number of unique training samples in a training dataset. The above described data augmentation, including a selecting of a plurality of different subsets of effectors as inputs, is possible with the network system because, as described here, the network system is configured to process semantic data of a variable number and type of input effectors. For example, the ML pose prediction system 100 model is not trained for a fixed number and type of inputs; instead, it is configured to handle any number of input effectors (and/or combinations of different effector types), each of which may have its own semantic meaning.

In accordance with an embodiment, the data augmentation may include augmentation based on a selecting of a plurality of different number of input effectors during training. For example, during training, the network may be forced to make predictions for all joints (e.g., for all joints in a character rig) based on any arbitrary subset of effector inputs. This can lead to a linear increase in a number of unique configurations of effectors. The above described data augmentation including a selecting of a plurality of different number of input effectors is possible with the network system because, as described here, the network system is configured to process semantic data of a variable number and type of input effectors.

In accordance with an embodiment, the data augmentation may include augmentation based on forcing a same encoder network to process random combinations of effector types during a training. Accordingly, a same encoder, with a same input may learn (e.g., during a training) to process both angular and positional measurements, increasing a flexibility of the trained network. For example, during a training, for any given sample, the network can be forced to predict all joints (e.g., for all joints in a character rig) based on a first combination of effector types (e.g., 3 joint positional effectors and 4 look-at effectors). In addition, for another sample, the network can be forced to predict all joints (e.g., for all joints in a character rig) based on a second combination of effector types (e.g., 10 joint positional effectors and 5 look-at effectors). The above described data augmentation including a processing of random combinations of effector types is possible with the network system because, as described here, the network system is configured to process semantic data of a variable number and type of input effectors.

In accordance with an embodiment, the data augmentation may include augmentation based on forcing a same encoder network to process input samples while randomly choosing a weight (e.g., importance level) for each effector. This results in an exponential growth of a number of unique input samples during training.

In accordance with an embodiment, the data augmentation may include augmentation based on adding random noise to coordinates and/or angles within each effector during a training. In accordance with an embodiment, a variance of the added noise during training may be configured so that it is synchronous with a weight (e.g., importance level) of an effector. This augmentation specifically forces the network to learn to respect certain effectors (e.g., effectors with a high weight) more than others (e.g., effectors with a low weight), on top of providing data augmentation. In accordance with an embodiment, data augmentation and training with the addition of random noise may have applications for processing results of monocular pose estimation, wherein each joint detection provided by a lower level pose estimation routine is accompanied with a measure of confidence.

In accordance with an embodiment, the data augmentation may be done on the fly during training to provide near infinite and variable input data for training (e.g., as opposed to pre-computing the data augmentation before training which only provides a fixed amount of input data). The on the fly data augmentation may also provide for a more variable input data set for training when compared to pre-computed data augmentation, by for example eliminating a possibility of using the same input data point (e.g., an input pose) twice since new input data is randomly generated when needed. For example, consider an original input data set of 1,000 poses, during a training, the ML pose prediction system 100 may generate additional input data via random translations and rotations as needed for training (e.g., based on a training metric). The generated additional input data during training may amount to 50,000 poses, 500,000 poses, 5 million poses or more and may be adjusted during training (e.g., depending on the training metric). This is in contrast to pre-computed data augmentation where data augmentation is computed before training and is fixed during training regardless of any training metric.

EXAMPLES

Using as few as 4 effectors for a whole human body (e.g., which may include 50 or more bones in a humanoid character rig) as inputs to a ML pose prediction system 100 (e.g., a ML pose prediction system 100 that uses the systems and methods described herein) allows for a prediction of realistic poses. For example, consider a ML pose prediction system 100 trained for predicting climbing poses of a human character with only the hands and feet used as inputs, and wherein an entire pose is predicted from the neural networks (e.g., without an external optimization process). In such a system, target positions for hands and feet can be linearly interpolated and body translation can be predicted by the ML pose prediction system 100 (rather than having body translation hardcoded or determined externally to the ML pose prediction system 100).

In accordance with an embodiment, the systems and methods described herein can be applied for retargeting a specific animation. For example, a source animation involving boxing of a humanoid character may be used to control feet effectors as well as one hand effector of a character, while the remaining hand of the character is controlled by the ML pose prediction system 100 and moved toward a specific target, wherein the specific target is externally controlled and input to the ML pose prediction system 100 (e.g., by a user with a joystick). The 4 effectors are used to generate a fully dynamic punch animation.

In accordance with an embodiment, the ML pose prediction system 100 may be used to capture animation poses from a video clip that includes undetected joints (e.g., due to a wrong pose estimation or clipped image) while producing natural poses as an output. The above described of determining animation poses from a video clip that includes undetected joints is possible with the network system because, as described here, the network system is configured to process semantic data of a variable number and type of input effectors (e.g., such as an unpredictable nature of undetected joints).

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

FIG. 3 is a block diagram 300 illustrating an example software architecture 302, which may be used in conjunction with various hardware architectures herein described to provide a gaming engine 3 and/or components of the ML pose prediction system 100. FIG. 3 is a non-limiting example of a software architecture and it will be appreciated that many other architectures may be implemented to facilitate the functionality described herein. The software architecture 302 may execute on hardware such as a machine 400 of FIG. 4 that includes, among other things, processors 410, memory 430, and input/output (I/O) components 450. A representative hardware layer 304 is illustrated and can represent, for example, the machine 400 of FIG. 4. The representative hardware layer 304 includes a processing unit 306 having associated executable instructions 308. The executable instructions 308 represent the executable instructions of the software architecture 302, including implementation of the methods, modules and so forth described herein. The hardware layer 304 also includes memory/storage 310, which also includes the executable instructions 308. The hardware layer 304 may also comprise other hardware 312.

In the example architecture of FIG. 3, the software architecture 302 may be conceptualized as a stack of layers where each layer provides particular functionality. For example, the software architecture 302 may include layers such as an operating system 314, libraries 316, frameworks or middleware 318, applications 320 and a presentation layer 344. Operationally, the applications 320 and/or other components within the layers may invoke application programming interface (API) calls 324 through the software stack and receive a response as messages 326. The layers illustrated are representative in nature and not all software architectures have all layers. For example, some mobile or special purpose operating systems may not provide the frameworks/middleware 318, while others may provide such a layer. Other software architectures may include additional or different layers.

The operating system 314 may manage hardware resources and provide common services. The operating system 314 may include, for example, a kernel 328, services 330, and drivers 332. The kernel 328 may act as an abstraction layer between the hardware and the other software layers. For example, the kernel 328 may be responsible for memory management, processor management (e.g., scheduling), component management, networking, security settings, and so on. The services 330 may provide other common services for the other software layers. The drivers 332 may be responsible for controlling or interfacing with the underlying hardware. For instance, the drivers 332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 316 may provide a common infrastructure that may be used by the applications 320 and/or other components and/or layers. The libraries 316 typically provide functionality that allows other software modules to perform tasks in an easier fashion than to interface directly with the underlying operating system 314 functionality (e.g., kernel 328, services 330 and/or drivers 332). The libraries 416 may include system libraries 334 (e.g., C standard library) that may provide functions such as memory allocation functions, string manipulation functions, mathematic functions, and the like. In addition, the libraries 316 may include API libraries 336 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 316 may also include a wide variety of other libraries 338 to provide many other APIs to the applications 320 and other software components/modules.

The frameworks 318 (also sometimes referred to as middleware) provide a higher-level common infrastructure that may be used by the applications 320 and/or other software components/modules. For example, the frameworks/middleware 318 may provide various graphic user interface (GUI) functions, high-level resource management, high-level location services, and so forth. The frameworks/middleware 318 may provide a broad spectrum of other APIs that may be utilized by the applications 320 and/or other software components/modules, some of which may be specific to a particular operating system or platform.

The applications 320 include built-in applications 340 and/or third-party applications 342. Examples of representative built-in applications 340 may include, but are not limited to, a contacts application, a browser application, a book reader application, a location application, a media application, a messaging application, and/or a game application. Third-party applications 342 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 342 may invoke the API calls 324 provided by the mobile operating system such as operating system 314 to facilitate functionality described herein. In accordance with an embodiment, the applications 320 may include a ML pose prediction module 370 which may implement the ML pose prediction system 100.

The applications 320 may use built-in operating system functions (e.g., kernel 328, services 330 and/or drivers 332), libraries 316, or frameworks/middleware 318 to create user interfaces to interact with users of the system. Alternatively, or additionally, in some systems, interactions with a user may occur through a presentation layer, such as the presentation layer 344. In these systems, the application/module "logic" can be separated from the aspects of the application/module that interact with a user.

Some software architectures use virtual machines. In the example of FIG. 3, this is illustrated by a virtual machine 348. The virtual machine 348 creates a software environment where applications/modules can execute as if they were executing on a hardware machine (such as the machine 400 of FIG. 4, for example). The virtual machine 348 is hosted by a host operating system (e.g., operating system 314) and typically, although not always, has a virtual machine monitor 346, which manages the operation of the virtual machine 348 as well as the interface with the host operating system (i.e., operating system 314). A software architecture executes within the virtual machine 348 such as an operating system (OS) 350, libraries 352, frameworks 354, applications 356, and/or a presentation layer 358. These layers of software architecture executing within the virtual machine 348 can be the same as corresponding layers previously described or may be different.

Figure 4:
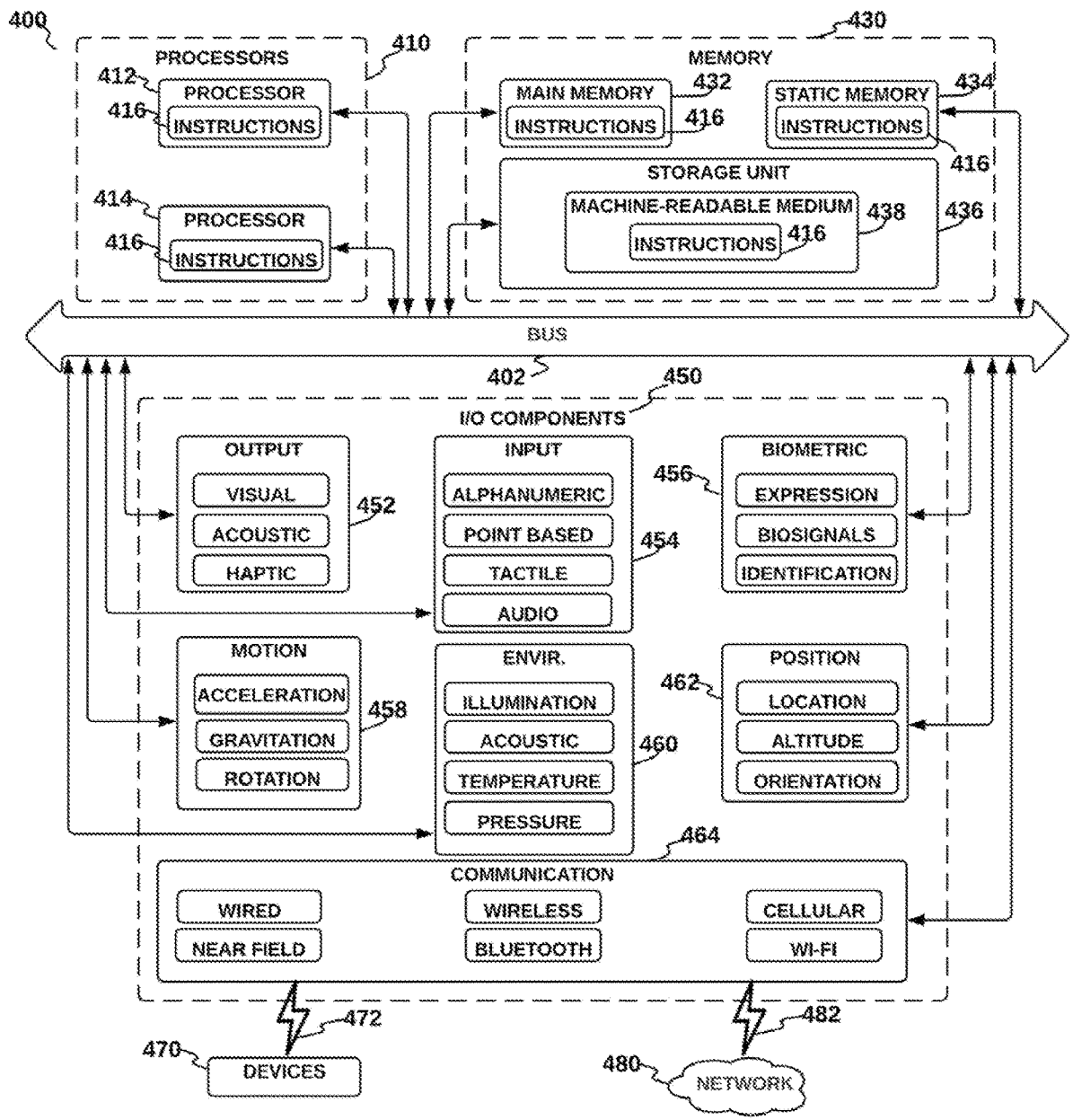
FIG. 4 is a block diagram illustrating components of a machine, according to some example embodiments, configured to read instructions from a machine-readable medium (e.g., a machine-readable storage medium) and perform any one or more of the methodologies discussed herein.

FIG. 4 is a block diagram illustrating components of a machine 400, according to some example embodiments, configured to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. As such, the instructions 416 may be used to implement modules or components described herein. The instructions transform the general, non-programmed machine into a particular machine programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines that individually or jointly execute the instructions 416 to perform any one or more of the methodologies discussed herein.

The machine 400 may include processors 410, memory 430, and input/output (I/O) components 450, which may be configured to communicate with each other such as via a bus 402. In an example embodiment, the processors 410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 412 and a processor 414 that may execute the instructions 416. The term "processor" is intended to include multi-core processor that may comprise two or more independent processors (sometimes referred to as "cores") that may execute instructions contemporaneously. Although FIG. 4 shows multiple processors, the machine 400 may include a single processor with a single core, a single processor with multiple cores (e.g., a multi-core processor), multiple processors with a single core, multiple processors with multiples cores, or any combination thereof.

The memory/storage 430 may include a memory, such as a main memory 432, a static memory 434, or other memory, and a storage unit 436, both accessible to the processors 410 such as via the bus 402. The storage unit 436 and memory 432, 434 store the instructions 416 embodying any one or more of the methodologies or functions described herein. The instructions 416 may also reside, completely or partially, within the memory 432, 434, within the storage unit 436, within at least one of the processors 410 (e.g., within the processor's cache memory), or any suitable combination thereof, during execution thereof by the machine 400. Accordingly, the memory 432, 434, the storage unit 436, and the memory of processors 410 are examples of machine-readable media 438.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 416. The term "machine-readable medium" shall also be taken to include any medium, or combination of multiple media, that is capable of storing instructions (e.g., instructions 416) for execution by a machine (e.g., machine 400), such that the instructions, when executed by one or more processors of the machine 400 (e.g., processors 410), cause the machine 400 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 450 may include a wide variety of components to receive input, provide output, produce output, transmit information, exchange information, capture measurements, and so on. The specific input/output (I/O) components 450 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 450 may include many other components that are not shown in FIG. 4. The input/output (I/O) components 450 are grouped according to functionality merely for simplifying the following discussion and the grouping is in no way limiting. In various example embodiments, the input/output (I/O) components 450 may include output components 452 and input components 454. The output components 452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 450 may include communication components 464 operable to couple the machine 400 to a network 480 or devices 470 via a coupling 482 and a coupling 472 respectively. For example, the communication components 464 may include a network interface component or other suitable device to interface with the network 480. In further examples, the communication components 464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., a peripheral device coupled via a Universal Serial Bus (USB)).

Moreover, the communication components 464 may detect identifiers or include components operable to detect identifiers. For example, the communication components 464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 462, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

We claim:

1. A system comprising:
   one or more computer processors;

one or more computer memories;
a set of instructions stored in the one or more computer memories, the set of instructions configuring the one or more computer processors to perform operations, the operations comprising:
combining a set of zero or more inputs including one or more different effector types for each of one or more joints of a character into a single input;
transforming the single input into a pose embedding, the pose embedding including a machine-learned representation of the single input; and
expanding the pose embedding into a pose representation output, the pose representation output including rotation data and position data for the one or more joints of the character.

2. The system of claim 1, wherein the expanding of the pose embedding into the pose representation output includes translating the pose embedding into predictions of 3D joint positions for the one or more joints, the translating using a global position decoder machine-learned model, and generating the rotation data for the one or more joints, the generating using an inverse kinematic decoder machine-learned model.

3. The system of claim 2, wherein one or more of the global position decoder machine-learned model and the inverse kinematic decoder machine-learned model are trained using a variable number and type of input effector constraints.

4. The system of claim 1, the operations further comprising:
transforming the rotation data by applying a forward kinematics pass to the pose representation output, the transforming including using one or more skeleton kinematic equations.

5. The system of claim 4, wherein the transforming includes using one or more neural networks that are programmable for use with each of variable numbers and types of the set of zero or more inputs without requiring retraining of the one or more neural networks.

6. The system of claim 1, wherein the transforming of the single input is performed by a pose encoder machine-learned model, wherein the pose encoder machine-learned model is trained using a variable number and type of input effector constraints.

7. The system of claim 1, wherein the transforming includes applying a machine-learned model that, during training, uses a combination loss function, the combination loss function including rotation and position error terms via randomized weights based on randomly-generated effector tolerance levels.

8. The system of claim 1, wherein a first joint of the one or more joints is constrained by 3D position coordinates and global rotation and a second joint of the one or more joints is constrained with a look-at effector.

9. A non-transitory computer-readable storage medium storing a set of instructions that, when executed by one or more computer processors, causes the one or more computer processors to perform operations, the operations comprising:
combining a set of zero or more inputs including one or more different effector types for each of one or more joints of a character into a single input;
transforming the single input into a pose embedding, the pose embedding including a machine-learned representation of the single input; and
expanding the pose embedding into a pose representation output, the pose representation output including rotation data and position data for the one or more joints of the character.

10. The non-transitory computer-readable storage medium of claim 9, wherein the expanding of the pose embedding into the pose representation output includes translating the pose embedding into predictions of 3D joint positions for the one or more joints, the translating using a global position decoder machine-learned model, and generating the rotation data for the one or more joints, the generating using an inverse kinematic decoder machine-learned model.

11. The non-transitory computer-readable storage medium of claim 10, wherein one or more of the global position decoder machine-learned model and the inverse kinematic decoder machine-learned model are trained using a variable number and type of input effector constraints.

12. The non-transitory computer-readable storage medium of claim 9, the operations further comprising:
transforming the rotation data by applying a forward kinematics pass to the pose representation output, the transforming including using one or more skeleton kinematic equations.

13. The non-transitory computer-readable storage medium of claim 9, wherein the transforming includes using one or more neural networks that are programmable for use with each of variable numbers and types of the set of zero or more inputs without requiring retraining of the one or more neural networks.

14. The non-transitory computer-readable storage medium of claim 9, wherein the transforming of the single input is performed by a pose encoder machine-learned model, wherein the pose encoder machine-learned model is trained using a variable number and type of input effector constraints.

15. The non-transitory computer-readable storage medium of claim 9, wherein the transforming includes applying a machine-learned model that, during training, uses a combination loss function, the combination loss function including rotation and position error terms via randomized weights based on randomly-generated effector tolerance levels.

16. A method comprising:
combining a set of zero or more inputs including one or more different effector types for each of one or more joints of a character into a single input;
transforming the single input into a pose embedding, the pose embedding including a machine-learned representation of the single input; and
expanding the pose embedding into a pose representation output, the pose representation output including rotation data and position data for the one or more joints of the character.

17. The method of claim 16, wherein the expanding of the pose embedding into the pose representation output includes translating the pose embedding into predictions of 3D joint positions for the one or more joints, the translating using a global position decoder machine-learned model, and generating the rotation data for the one or more joints, the generating using an inverse kinematic decoder machine-learned model.

18. The method of claim 17, wherein one or more of the global position decoder machine-learned model and the inverse kinematic decoder machine-learned model are trained using a variable number and type of input effector constraints.

19. The method of claim 16, further comprising:
transforming the rotation data by applying a forward kinematics pass to the pose representation output, the transforming including using one or more skeleton kinematic equations.

20. The method of claim 19, wherein the transforming includes using one or more neural networks that are programmable for use with each of variable numbers and types of the set of zero or more inputs without requiring retraining of the one or more neural networks.

\* \* \* \* \*